US012331958B2

(12) United States Patent
Zareh et al.

(10) Patent No.: US 12,331,958 B2
(45) Date of Patent: Jun. 17, 2025

(54) MONITORING AND CONTROLLING DOMESTIC HOT WATER PRODUCTION AND DISTRIBUTION

(71) Applicants: DAIKIN INDUSTRIES, LTD., Osaka (JP); DAIKIN EUROPE N.V., Ostend (BE)

(72) Inventors: Mehran E Zareh, Ostend (BE); Kristof Vandemergel, Ostend (BE)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 526 days.

(21) Appl. No.: 17/642,788

(22) PCT Filed: Dec. 9, 2020

(86) PCT No.: PCT/JP2020/045775
§ 371 (c)(1),
(2) Date: Mar. 14, 2022

(87) PCT Pub. No.: WO2021/124997
PCT Pub. Date: Jun. 24, 2021

(65) Prior Publication Data
US 2022/0397306 A1 Dec. 15, 2022

(30) Foreign Application Priority Data
Dec. 20, 2019 (EP) ..................... 19218588

(51) Int. Cl.
*F24H 15/172* (2022.01)
*F24D 19/10* (2006.01)
(Continued)

(52) U.S. Cl.
CPC ....... *F24H 15/172* (2022.01); *F24D 19/1054* (2013.01); *F24D 19/1063* (2013.01);
(Continued)

(58) Field of Classification Search
CPC .... F24D 19/1054; F24D 19/1063; F24H 1/20; F24H 15/148; F24H 15/156;
(Continued)

(56) References Cited

U.S. PATENT DOCUMENTS

2003/0194228 A1* 10/2003 Bradenbaugh ........ F24H 15/156
392/451
2012/0042445 A1* 2/2012 Mc Queen ............ F24H 15/325
126/357.1
(Continued)

FOREIGN PATENT DOCUMENTS

CN 102589139 A 7/2012
GB 2483362 A 3/2012
(Continued)

OTHER PUBLICATIONS

Cao et al., Predictive control based on occupant behavior prediction for domestic hot water system using data mining algorithm, 2019, p. 1214-1232. (Year: 2019).*
(Continued)

*Primary Examiner* — Kidest Bahta
(74) *Attorney, Agent, or Firm* — GLOBAL IP COUNSELORS, LLP

(57) ABSTRACT

A computer-implemented method monitors and/or controls domestic hot water production and/or distribution. The method includes detecting at least two real temperatures of a fluid stored in a heat storage tank at two different positions along a height of the heat storage tank at least at points in time, and acquiring a temperature distribution pattern of heat stored in the heat storage tank and/or corresponding heat distribution pattern data by applying a temperature-distribution-pattern-algorithm to the detected real temperatures detected at the points in time. The fluid is sanitary hot water, and the heat storage tank is a pressurized tank. A computer may carry out the method. The computer may be part of a
(Continued)

system. A computer program may include instructions to cause the controller of to execute the method. The computer program may be stored on a computer-readable medium.

18 Claims, 12 Drawing Sheets

(51) Int. Cl.
| | |
|---|---|
| *F24H 1/20* | (2022.01) |
| *F24H 15/148* | (2022.01) |
| *F24H 15/156* | (2022.01) |
| *F24H 15/176* | (2022.01) |
| *F24H 15/225* | (2022.01) |
| *F24H 15/238* | (2022.01) |
| *F24H 15/25* | (2022.01) |
| *F24H 15/414* | (2022.01) |
| *G05B 19/4155* | (2006.01) |
| *F24H 15/215* | (2022.01) |
| *F24H 15/219* | (2022.01) |
| *F24H 15/395* | (2022.01) |

(52) U.S. Cl.
CPC ............. *F24H 1/20* (2013.01); *F24H 15/148* (2022.01); *F24H 15/156* (2022.01); *F24H 15/176* (2022.01); *F24H 15/225* (2022.01); *F24H 15/238* (2022.01); *F24H 15/25* (2022.01); *F24H 15/414* (2022.01); *G05B 19/4155* (2013.01); *F24H 15/215* (2022.01); *F24H 15/219* (2022.01); *F24H 15/395* (2022.01); *G05B 2219/50333* (2013.01)

(58) Field of Classification Search
CPC .... F24H 15/172; F24H 15/176; F24H 15/215; F24H 15/219; F24H 15/225; F24H 15/238; F24H 15/25; F24H 15/395; F24H 15/414; G05B 19/4155; G05B 2219/50333; G05D 23/1917; G05D 23/1931

See application file for complete search history.

(56) References Cited

U.S. PATENT DOCUMENTS

| | | | | |
|---|---|---|---|---|
| 2012/0090341 | A1* | 4/2012 | Hatada | F24H 15/269 62/238.7 |
| 2014/0379147 | A1* | 12/2014 | Hatada | F24H 15/219 700/282 |
| 2015/0129158 | A1* | 5/2015 | Hemrle | F28D 20/00 165/104.19 |
| 2015/0226460 | A1 | 8/2015 | Zemach | |
| 2015/0253051 | A1* | 9/2015 | Jin | F25B 49/02 62/56 |
| 2016/0169556 | A1* | 6/2016 | Buescher | F24H 15/238 219/494 |

FOREIGN PATENT DOCUMENTS

| | | |
|---|---|---|
| JP | 2005-172361 A | 6/2005 |
| JP | 2010-54131 A | 3/2010 |
| WO | 2012/162763 A1 | 12/2012 |

OTHER PUBLICATIONS

International Search Report of corresponding PCT Application No. PCT/JP2020/045775 dated Feb. 18, 2021.
European Search Report of corresponding EP Application No. 19 21 8588.2 dated Jun. 9, 2020.
International Preliminary Report of corresponding PCT Application No. PCT/JP2020/045775 dated Jun. 30, 2022.

* cited by examiner

MONITORING AND CONTROLLING DOMESTIC HOT WATER PRODUCTION AND DISTRIBUTION

CROSS-REFERENCE TO RELATED APPLICATIONS

This U.S. National stage application claims priority under 35 U.S.C. § 119(a) to European Patent Application No. 19218588.2, filed in Europe on Dec. 20, 2019, the entire contents of which are hereby incorporated herein by reference.

BACKGROUND

FIELD OF THE INVENTION

The present disclosure relates to computer-implemented system for monitoring and/or controlling domestic hot water production and/or distribution, particularly by monitoring and/or controlling a system for domestic hot water production and/or distribution, a controller and a system for domestic hot water production and/or distribution. Moreover, the disclosure relates to a corresponding computer program and a computer-readable medium having stored thereon said a computer program.

BACKGROUND INFORMATION

In recent years buildings like homes or office spaces have been equipped with smart home networks to provide automated control of devices, appliances and systems, such as heating, ventilation, and air conditioning ("HVAC") system, lighting systems, alarm systems, home theatre and entertainment systems. Smart home networks may include control panels that a person may use to input settings, preferences, and scheduling information that the smart home network uses to provide automated control the various devices, appliances and systems in the building. For example, a person may input a desired temperature and a schedule indicating when the person is away from home. The home automation system uses this information to control the HVAC system to heat or cool the home to the desired temperature when the person is home, and to conserve energy by turning off power-consuming components of the HVAC system when the person is away from the home or for example sleeping.

Similar ideas exist in the field of domestic hot water production or distribution. The heating demand in domestic environments is made up of two main sources: sanitary hot water production and space heating. Sanitary hot water is typically produced either on-demand (requiring a relatively high-power device such as a gas boiler) or using a buffered approach with a hot water tank, which can be heated from a variety of sources, such as electric, solar, gas and heat pump. The demand for space heating of housing reduces in absolute values, thanks to the improved insulations (e.g. passive housing) and smaller houses. On the other hand, the demand for domestic hot water remains and even slightly increases. Hence, sanitary hot water production has a larger relative share in the total domestic heating demand.

In case of systems with a hot water storage tank, in order to provide the user with sufficient hot water, usually a fixed minimum temperature of the tank is set throughout the day, where the desired minimum temperature is chosen at the safe side. For energy saving reasons, newer systems use a fixed pattern through a weekly schedule. For example, the minimum temperature of the tank is lowered through the night or in the morning, when higher demand is expected, the temperature of the tank is increased.

In order to further improve energy efficiency of domestic hot water systems using a hot water storage tank, it is necessary to estimate the available usable hot water content of the tank. This is generally done by detecting and measuring the use of domestic hot water. Known systems use for this purpose a monitoring system including a flow meter and a temperature sensor. Based on the outputs of these units the system estimates the energy which is thought to be taken out of the hot water storage tank and estimates the remaining usable hot water content of the tank.

(US 2015/0226460 A1 for example describes a retrofit water boiler monitoring and forecast system, method and computer program product, for a water boiler system which includes a water boiler, a cold-water pipe, a hot-water pipe, including: an intake temperature sensor, configured to measure a water temperature in the cold-water intake pipe; a flow meter, configured to measure a flow rate of water running through the water boil system; an outlet temperature sensor, configured to measure a water temperature in the hot-water outlet pipe; a processing unit, adapted to receive sensor date from the intake temperature sensor, flow meter, and outlet temperature sensor, and configured to calculate an amount of available hot water in the water boiler based on the sensor data; and a display panel coupled to the processing unit configured to display at least one estimated real-time usage value, calculated by the processing unit based on the amount of available hot water.

SUMMARY

In view of the above, there is the desire to provide a computer-implemented method of monitoring and/or controlling domestic hot water production and/or distribution, a controller for a domestic hot water production and/or distribution system, a system for domestic hot water production and/or distribution, a computer program and a computer readable medium having stored thereon the computer program, allowing a more accurate estimation and monitoring of the available usable hot water content of a hot water storage tank while improving the energy efficiency of domestic hot water distribution. Accordingly, allowing a smart control of the domestic hot water distribution by automatically adapting the water heating process to individual usage conditions with the aim of reducing energy consumption while maintaining user comfort.

This aim may be achieved by a computer-implemented method of monitoring and controlling domestic hot water production and/or distribution as defined in claim 1, a computer-implemented method of monitoring and controlling domestic hot water production and/or distribution as defined in claim 11, a controller for a domestic hot water production and/or distribution system as defined in claim 13, a system for domestic hot water production and/or distribution as defined in claim 14, a computer program as defined in claim 17 and a computer-readable medium as defined in claim 18. Embodiments may be found in the dependent claims, the following description and the accompanying drawings.

According to a first aspect of present disclosure, a computer-implemented method of monitoring and/or controlling domestic hot water production and/or distribution, particularly by controlling a system for domestic hot water production and/or distribution, the method comprising:

detecting or acquiring at least two real or actual temperatures of a fluid, particularly sanitary hot water, that is stored in a heat storage tank, in particular a pressurized tank, at least two different positions along the height of the heat storage tank, which is preferably a direction parallel to the direction of gravity, at least at few points in time, preferably at several points in time, and acquiring at least one temperature distribution pattern of heat of the fluid stored in the heat storage tank and/or corresponding heat distribution pattern data by applying a temperature-distribution-pattern-algorithm to the detected or acquired at least two temperatures detected or acquired at least at few points in time, preferably at several points in time.

In this way it becomes possible to more accurate estimation and monitoring of the available and/or usable hot water content of a hot water storage tank while improving the energy efficiency of domestic hot water production and/or distribution. Moreover, since it becomes possible to accurately estimate the heat and/or equivalent hot water stored in a hot water storage tank by only using temperature sensors, the need of a flow detector for detecting the amount of hot water tapped from the hot water storage tank becomes obsolete. In the present invention, the term "monitoring" concerning the "monitoring of domestic hot water production and/or distribution" is used to define that the production of for example domestic hot water is detected and optionally recorded using virtual and real temperature sensors. For example, when hot water is tapped from the hot water storage tank, a change or alteration in the temperature distribution pattern in the hot water storage tank is detected and/or determined and based thereon is an amount of heat (kWh) remaining in the hot water storage tank and/or tapped from the hot water tank determined and/or recorded.

Moreover, the term "controlling" concerning the "controlling domestic hot water production and/or distribution" defines in the present invention that for example based on detected temperatures or detected flow rates and/or based on estimated values or patterns, like the temperature distribution pattern, the production of domestic hot water is changed, for example increased or decreased by starting or stopping heating of the stored hot water by the loading coil.

Furthermore, the term "production" concerning the "monitoring and/or controlling domestic hot water production" defines in the present invention the production of hot water, meaning the increase of the temperature above 40° C. In more detail, in order to produce a certain amount of domestic hot water, the loading coil is provided with a hot fluid, which is for example heated and provided by a heat pump. By heat transfer between the fluid flowing through the loading coil and hot water stored in the hot water storage tank, the hot water stored in the tank is heated, meaning the temperature of the hot water is increased.

Yet, in the present invention the term "distribution" concerning the "monitoring and/or controlling domestic hot water distribution" defines the distribution or making available (providing) of hot water, particularly water with a temperature above 40° C., to respective users, like a shower or a bathroom.

The computer-implemented method may further comprise:
acquiring or simulating a plurality of virtual temperatures, preferably at least 5 virtual temperatures, particularly more than 10 virtual temperatures, more particularly more than 20 virtual temperatures, of the fluid stored in the heat storage tank at different positions along the height of the heat storage tank by applying a virtual-temperature-sensor-algorithm to the detected at least two real or actual temperatures detected at least at few points in time, preferably at several points in time, and acquiring or simulating the temperature distribution pattern of heat stored in the heat storage tank and/or corresponding heat distribution pattern data by applying the temperature-distribution-pattern-algorithm to the detected at least two real or actual temperatures and the acquired or simulated plurality of virtual temperatures, where preferably the virtual temperatures are acquired or simulated by using a neural network.

The computer-implemented method may further comprise:
determining an amount of heat, in particular an amount of equivalent hot water (EHW, V40), stored in the heat storage tank by applying a heat-estimation-algorithm to the acquired temperature distribution pattern and/or the detected at least two real or actual temperatures and the acquired plurality of virtual temperatures, and/or acquiring at least two temperature distribution patterns and/or corresponding heat pattern data by applying the temperature-distribution-pattern-algorithm to at least two sets of acquired temperatures, preferably a plurality of sets of detected and/or acquired temperatures, preferably comprising the detected real temperatures and/or the acquired virtual temperatures, which are detected at least at two different points in time, and determining an amount of heat, in particular an amount of equivalent hot water, tapped from the heat storage tank by applying a tapping-estimation-algorithm to the at least two temperature distribution patterns (indirect tapping estimation).

In the present invention, the term "heat" concerning the "amount of heat stored in the heat storage tank" and "amount of heat tapped from the heat storage tank" is used to define the energy which is stored in the heat storage tank and usable for providing hot water to a user. Accordingly, the term "heat" refers for example to the remaining equivalent hot water (EHW) at $t_0$.

The term "equivalent hot water (EHW)" corresponds to the maximum hot water volume "$V_{40}$" as defined in EN16147. According to EN16147, the maximum amount of mixed water at 40° C. in one single draw-off (from a specific heat storage tank) shall be determined by calculating the hot water energy during the draw-off. The hot water flow rate $f_{max}$ together with the temperatures of the incoming cold water $\theta_{wc}$ and the outgoing hot water $\theta_{WH}$ are measured during the draw-off at least each 10 s. The maximum hot water volume V40 is calculated using following formula:

$$V_{40} = \frac{1}{(40-10) \times 60} \int_0^{t_{40}} f_{max}(t) \times [\theta_{WH}(t) - \theta_{WC}(t)] dt$$

where:
$V_{40}$ is the maximum volume of mixed water at 40° C. in l;
$\theta_{WH}(t) - \theta_{WC}(t)$ is the temperature difference between hot water temperature at outlet and cold water at inlet of domestic hot water storage in K:
$t_{40}$ is the time from starting the draw-off until $\theta_{WH}(t)$ is less than 40° C. in s:
$f_{max}(t)$ is the flow rate of hot water during draw-off in l/min.

According to a further aspect, the temperature distribution pattern acquiring step, in particular the temperature-distribution-pattern-algorithm, of the computer-implemented method comprises:

determining the temperature distribution pattern of the heat stored in the heat storage tank by processing the detected at least two real or actual temperatures, detected at least at few points in time, preferably at several points in time, more particularly the detected at least two real or actual temperatures and the acquired or simulated plurality of virtual temperatures, using a regression-algorithm, wherein the regression-algorithm is preferably trained on temperature data defining temperature distribution patterns of the heat stored in the heat storage tank using one or more machine-learning-algorithms.

Moreover, the regression-algorithm of the computer-implemented method may be trained on:

Temperatures and/or temperature data detected by a plurality of temperature sensors, preferably including the two temperature sensors used for detecting the at least two temperatures, provided at different positions along the height of the heat storage tank, and/or heat coil input and/or output temperature(s), particularly during heating/heat up of the fluid stored in the heat storage, and/or flow rate(s) at an inlet and/or an outlet of the fluid into/from the heat storage tank, and/or flow rate of the fluid (heating fluid) flowing through the heat coil.

Further, the computer-implemented method may comprise:

acquiring a flow rate and/or amount of fluid, in particular amount of hot water, tapped from the heat storage tank by using at least one flow rate sensor, preferably arranged at an outlet of the fluid from the heat storage tank, and/or determining an amount of heat, in particular an amount of equivalent hot water (EHW, $V_{40}$), tapped from the heat storage tank by applying an indirect-tapping-estimation-algorithm to the at least two temperature distribution patterns and a flow rate of the fluid flowing through the heat coil (indirect tapping estimation).

Moreover, in the computer-implemented method at least one temperature distribution pattern may be acquired and/or determined by using:

the at least two temperature sensors, in particular real temperature sensors, and a plurality of virtual temperature sensors, preferably at least 5 virtual temperature sensors, particularly more than 10 virtual temperature sensors, more particularly more than 20 virtual temperature sensors, which are used for acquiring the plurality of virtual temperatures, preferably the at least 5 virtual temperatures, wherein the virtual temperature sensors are preferably provided and/or simulated by an (artificial) neural network.

In the present invention, the term "rea/" in "real temperature" and "real temperature sensors" is used for defining temperature sensors that are (actually) physically provided in the system for monitoring and/or controlling domestic hot water production and hence actually measure real (live) temperatures. In other words, the real temperature sensors are in fact physically provided at the heat storage tank and actually measure a temperature of the fluid stored in the heat storage tank.

On the other hand, the term "virtual" in "virtual temperatures" and "virtual temperature sensors" is used in the present invention to define that the sensors are not physically provided in the system for monitoring and/or controlling domestic hot water production. Instead, the virtual temperature sensors are somewhat simulated by the neural network as explained below in more detail. The temperature values of the virtual sensors are determined by the trained neural network based on the inputs of the real temperature sensors, hence, the acquired or simulated temperatures are called "virtual temperatures".

Furthermore, the computer-implemented method may comprise:

acquiring a user consumption pattern by applying a user-consumption-algorithm to:
a) the acquired temperature distribution pattern(s) of the heat stored in the heat storage tank, and/or
b) the determined amount of heat or amount of equivalent hot water, stored in the heat storage tank, and/or
c) the determined amount of heat or equivalent hot water tapped from the heat storage tank by using the indirect-tapping-estimation-algorithm, and/or
d) the determined amount of fluid or hot water tapped from the heat storage tank by using the at least one flow rate sensor.

Moreover, the computer-implemented method may further comprise:

determining a heating pattern and/or hot water production control pattern of the fluid stored in the heat storage tank by applying a heating-pattern-algorithm to the acquired user consumption pattern, wherein the user consumption pattern and/or the heating pattern and/or hot water production control pattern is/are divided into time increments of one day, 12 hours, 6 hours, 1 hour, 30 minutes, 10 minutes, and/or 1 minute.

This means, the user consumption pattern is for example a collection of the acquired temperature distribution pattern (s) of the heat stored in the heat storage tank and/or the determined amount of heat or amount of equivalent hot water, stored in the heat storage tank, at a plurality of timepoints, for example 10 times per hour, and based on the ten data sets an average value is calculated which defines and/or characterizes one increment, in this case an increment of one hour. Based on the acquired increments, a user consumption pattern can be determined. Same applies for the heating pattern and/or hot water production control pattern.

For example, does a user consumption pattern show that a specific user always has a high domestic hot water demand at a specific time, for example in the morning from 6 am to 8 am (taking shower), the heating pattern can be adapted accordingly, meaning that at the time from 6 am to 8 am an unusual high amount of hot water is made available.

Furthermore, in the computer-implemented method at least ten, preferably at least twenty, more preferably at least thirty temperatures may be acquired at least at ten points in time, preferably at least at twenty points at time, more preferably at least at thirty points in time, before a temperature distribution pattern of the heat storage tank is determined.

In this way, an accuracy in determining the temperature distribution pattern can be improved. In detail, before a temperature distribution pattern is determined, a plurality of temperature sets of the at least two temperatures is acquired at several points in time and based on the plurality of temperature sets (history) a temperature distribution pattern is determined using an (artificial) neural network.

Moreover, the invention provides a computer-implemented method of monitoring and/or controlling domestic hot water production and/or distribution, particularly by monitoring and/or controlling a system for monitoring and/or controlling domestic hot water production and/or distribution, the method comprising:

detecting at least two real temperatures of a fluid, particularly sanitary hot water, that is stored in a heat storage tank, in particular a pressurized tank, at at least two different positions along the height of the heat storage tank at least at few points in time, acquiring an amount of fluid tapped from the heat storage tank by applying a fluid-tapping-estimation-algorithm to the at least two real temperatures detected at least at few points in time, and acquiring an amount of heat or an amount of equivalent hot water tapped from the heat storage tank by applying a direct-tapping-estimation-algorithm to the acquired amount of fluid tapped from the heat storage tank and a topmost layer temperature of the heat storage tank.

Furthermore, in the computer-implemented method the topmost layer temperature may be detected by a temperature sensor, particularly a real temperature sensor, that is provided near an outlet of the heat storage tank, and/or acquired by the topmost real or virtual temperature sensor of the above described computer-implemented method.

The invention further provides a controller for monitoring and/or controlling a domestic hot water production and/or distribution system having a control unit and means adapted to execute the above described steps of the computer-implemented method.

The invention further provides a system for monitoring and/or controlling domestic hot water production and/or distribution having a controller, in particular the above described controller, and means adapted to execute the above described steps of the computer-implemented method.

The system may further comprise:
   a heat storage tank, particularly a hot water storage tank, more particularly a pressurized hot water storage tank, and
   at least two temperature sensors that are provided at two different positions along the height of the hot water storage tank and configured to detect the temperature of a fluid, particularly sanitary hot water, that is stored in the hot water storage tank.

Moreover, in the system the number of the at least two temperature sensors is at most 5, preferably at most 4, more preferably at most 3, and one of the at least two temperature sensors is preferably located in a bottom half of the heat storage tank, more preferably in a bottom third of the heat storage tank.

Since the controller and the system are adapted to execute the above described steps of the computer-implemented methods, the further features disclosed in connection with the computer-implemented methods may also be applied to the controller and the system. The same applies vice versa for the computer-implemented methods.

The invention further provides a computer program comprising instructions to cause the above described controller for a domestic hot water production and/or distribution system and/or the above described system for domestic hot water production and/or distribution to execute the above described steps of the computer-implemented method of monitoring and/or controlling domestic hot water production and/or distribution.

Moreover, the invention provides a computer-readable medium having stored thereon the above described computer program for monitoring and/or controlling domestic hot water production and/or distribution.

In this regard, the above described computer-implemented method cannot only be performed by the controller and the system which are adapted to execute the described steps of the computer-implemented method, the method can also be performed by cloud-computation. Meaning, the data of the real temperature sensors of a specific heat storage tank are sent to the cloud, the cloud is adapted to execute the above described steps of the computer-implemented method and sends back the acquired data like temperature distribution pattern, equivalent hot water stored in the heat storage tank, heat and/or equivalent hot water tapped from the heat storage tank, consumer pattern etc. to a controller and/or user of the respective system for monitoring and/or controlling domestic hot water.

Since the computer program and the computer-readable medium are also related to the above described controller and system for domestic hot water production and/or distribution, the further features disclosed in connection with the computer-implemented methods, the controller and the system may also be applied to the computer program and the computer-readable medium and vice versa.

BRIEF DESCRIPTION OF DRAWINGS

A more complete appreciation of the present disclosure and many of the attendant advantages thereof will be readily obtained as the same becomes better understood by reference to the following detailed description when considered in connection with the accompanying drawings.

DETAILED DESCRIPTION OF EMBODIMENT(S)

Several embodiments of the present disclosure will now be explained with reference to the drawings. It will be apparent to those skilled in the field of domestic hot water production and/or distribution from this disclosure that the following description of the embodiments is provided for illustration only and not for the purpose of limiting the disclosure as defined by the appended claims.

Figure 1:
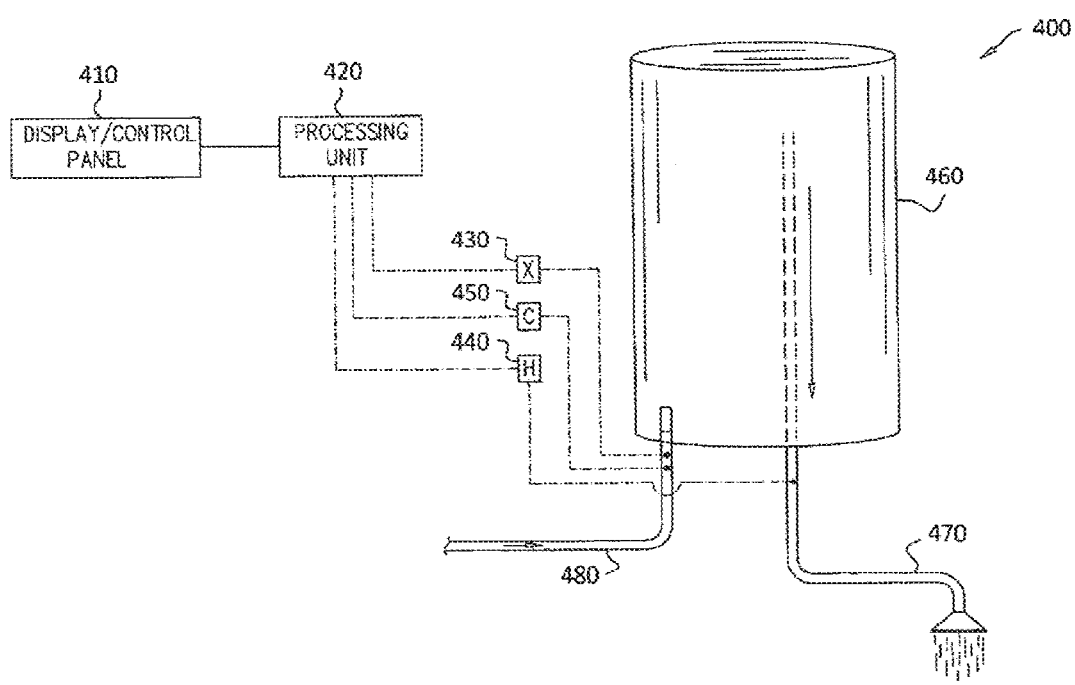
FIG. 1 is a schematic illustration showing a conventional forecast system for a water boiler system.

FIG. 1 is a schematic illustration showing a conventional forecast system for a water boiler system. In FIG. 1 a water heater (boiler) system 400 is augmented with an immediate monitoring and forecast system. A typical water boiler system includes a water boiler 460, a cold-water intake pipe 480 which brings in cold water from an external source, and a hot water outlet pipe 470 from the boiler (usually located near the top of the boiler where the hottest water is found) to a household system of pipes for dispersion throughout the house (e.g. to the bathroom, kitchen, laundry room etc.). The system collects data form three sensors assembled on the boiler: a first temperature sensor (C) 450 measures the temperature of the water in the intake line 480; a second temperature sensor (H) 440 measures the temperature of the water in hot-water outlet pipe leading out of the boiler, and a flow meter (X) 430 which measures the flow rate of water moving through the cold-water intake line, into the boiler. The flow rate sensor can be placed on either the intake or outlet lines as the boiler system is a closed system. The system analysed input from the sensors, calculates the amount of available hot water and displays a real-time estimation of water availability on a display unit 410 which is preferably located in a bathing area such as a shower or bathroom.

Figure 2:
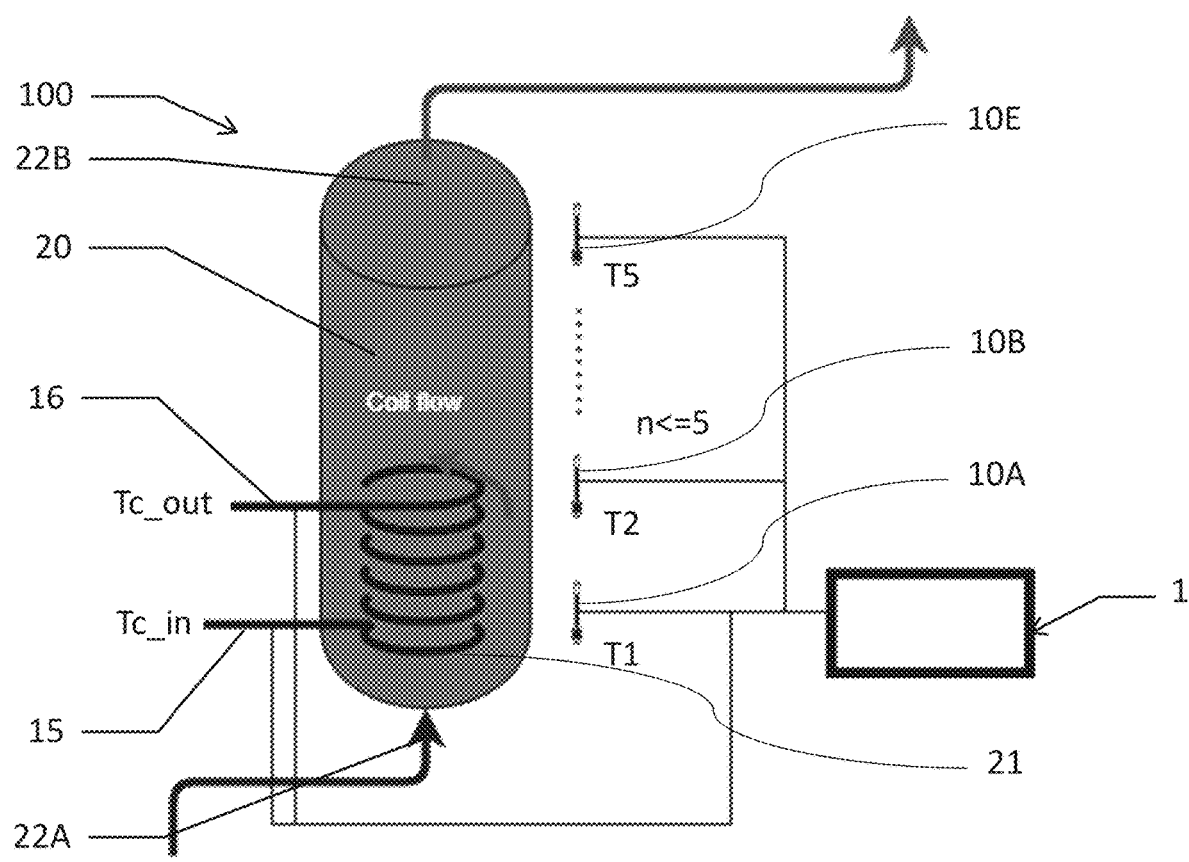
FIG. 2 is a schematic illustration of a system for monitoring and/or controlling domestic hot water production and/or distribution shown in a deployed stage according to an aspect of the present invention.

FIG. 2 is a schematic illustration of a system for monitoring and/or controlling domestic hot water production and/or distribution shown in a deployed stage according to a first aspect of the present invention. The shown system comprises a controller 1 for monitoring and controlling domestic hot water production and distribution, a heat storage tank 20 for storing heated water, particularly water that is heated above 40° C., and five temperature sensors 10A to 10B for detecting the temperature of the hot water stored in the heat storage tank 20.

Moreover, as shown FIG. 2, the heat storage tank 20 which is preferably a pressurized tank comprises a coil or loading coil that is located in the bottom half of the tank. Since the temperature distribution of the hot water stored in the heat storage tank 20 or hot water storage tank is layered (layer stratification), which means that even if the water near the bottom is cold (below 40° C.), hot water can still be tapped from the tank. In case the heat source for heating the hot water stored in the heat storage tank 20 is for example a heat pump, the beat pump can operate in the initial phase of the tank heat up in a better COP, since the provided hot water only needs to have a temperature slightly (ΔT about 3° C.) higher than the temperature of the water at the bottom half of the tank.

Moreover, since the hot water stored in the heat storage tank 20 is layered, the temperature increases continuously from the bottom of the tank to the top of the tank, leading to a characteristic temperature distribution pattern. As the temperature is increasing from the bottom of the tank to the top of the tank, the temperature sensors 10A to 10E, provided at different positions along the height of the hot water storage tank 20, measure different temperatures dependent on the location/height of the respective sensor.

The shown hot water storage tank 20 is provided with a cold-water intake/inlet 22A which lets in cold water from an external source and a hot water outlet/outlet 22B for tapping hot water from the hot water storage tank 20. The inlet 22A is provided in a bottom third of the tank and the outlet 22B is located near the top of the tank where the hottest water is found. From the outlet 22B the hot water can for example be distributed to a household by pipes for dispersion throughout the house.

Moreover, the shown system 100 comprises further a pair of temperature sensors 15, 16 for detecting the inlet temperature and outlet temperature of the fluid (heating fluid) flown through the loading coil.

The system uses the controller 1 to acquire by using the (real) temperature sensors 10A to 10E five (real) temperatures $T_{1R\_t0}$ $T_{5R\_t0}$ of the layered hot water stored in the hot water storage tank 20. Based on the acquired five real temperatures $T_{1R\_t0}$ $T_{5R\_t0}$ the system further acquired a temperature distribution patter $TDP_1$ of heat stored in the hot water storage tank 20 and corresponding heat distribution pattern data. In order to determine the temperature distribution patter $TDP_1$ and the corresponding heat distribution pattern data, the controller 1 applies a temperature-distribution-pattern-algorithm that will be explained in more detail below. Based on the acquired heat-distribution-pattern-algorithm the controller 1 then determines an amount of heat, in particular an amount of equivalent hot water, stored in the hot water storage tank 20, this is also done by applying a heat-estimation-algorithm to the acquired temperature distribution pattern ($TDP_1$).

When the above described process is repeated over the time, particularly after a certain amount of hot water has been tapped from the tank 20 or the temperature of the hot water stored in the tank 20 has dropped because of heat loss to the surrounding environment, the system can acquire several temperature distribution patterns $TDP_1$, $TDP_2$ to $TDP_n$. Based on the acquired temperature distribution patterns $TDP_1$, $TDP_2$ to $TDP_n$ the controller can determine a remaining amount of heat in the hot water storage tank 20 and an amount of heat, in particular an amount of equivalent hot water, tapped from the heat storage tank by applying an indirect-tapping-estimation-algorithm to the acquired temperature distribution patterns $TDP_1$, $TDP_2$ to $TDP_n$.

Figure 3:
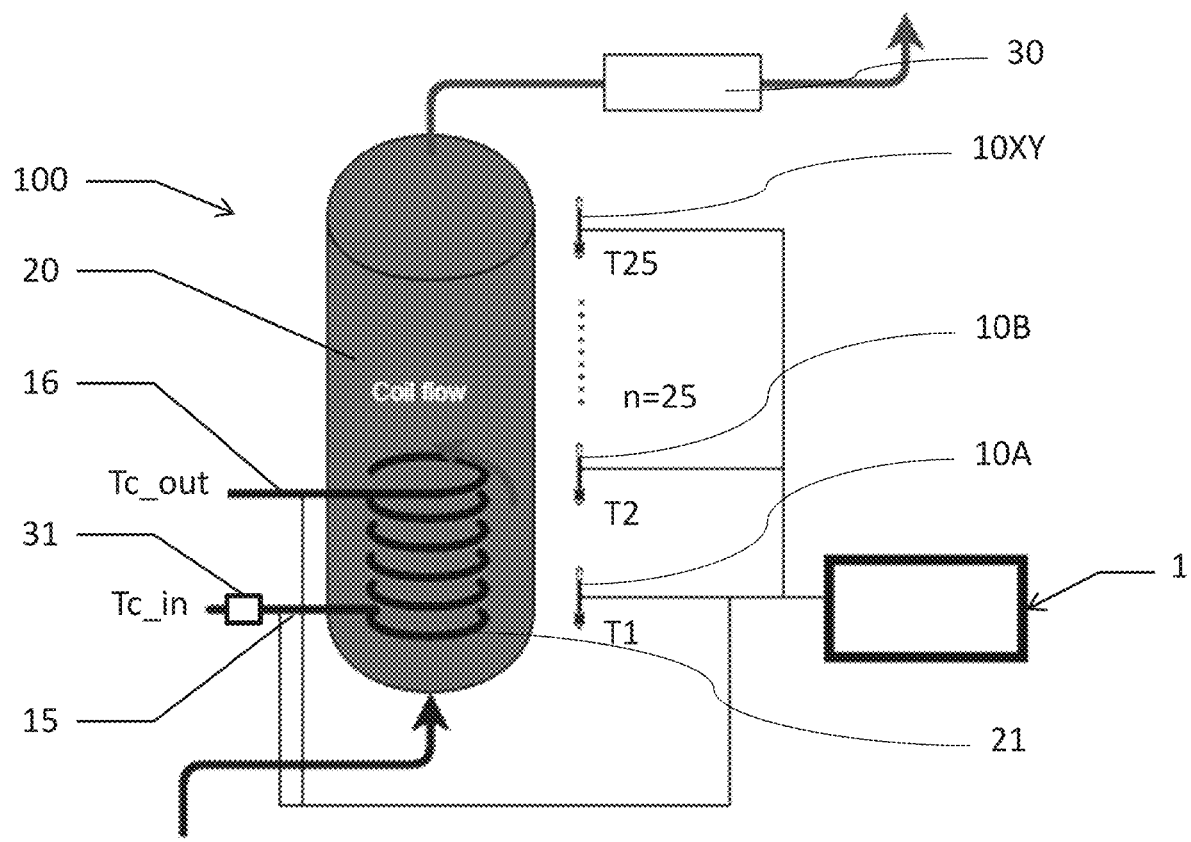
FIG. 3 is a schematic illustration of a system for monitoring and/or controlling domestic hot water production and/or distribution shown in a training stage according to an aspect of the present invention.

FIG. 3 is a schematic illustration of a system for monitoring and/or controlling domestic hot water production and/or distribution shown, particularly the one of FIG. 2, in a training stage according to a second aspect of the present invention. The shown system comprises all components explained above with regard to the system shown in FIG. 2. Furthermore, the system is provided for training purposes with additional 20 (real) temperature sensors, which are also provided along the height of the hot water storage tank 20 on different positions, a flow rate sensor 30 for measuring a flow rate of the hot water tapped from the hot water storage tank 20 and a flow rate sensor 31 for measuring a flow rate of the fluid (heating fluid) flowing through the coil.

As explained above, this system 100 is used for training the system to acquire or determine or simulate the temperature distribution pattern of the heat or hot water stored in the heat storage tank or hot water storage tank 20. The training of the system, particularly of the temperature-distribution-pattern algorithm, heat-estimation-algorithm, indirect-tapping-estimation-algorithm and the regression-algorithm is explained in more detail below.

Figure 4:
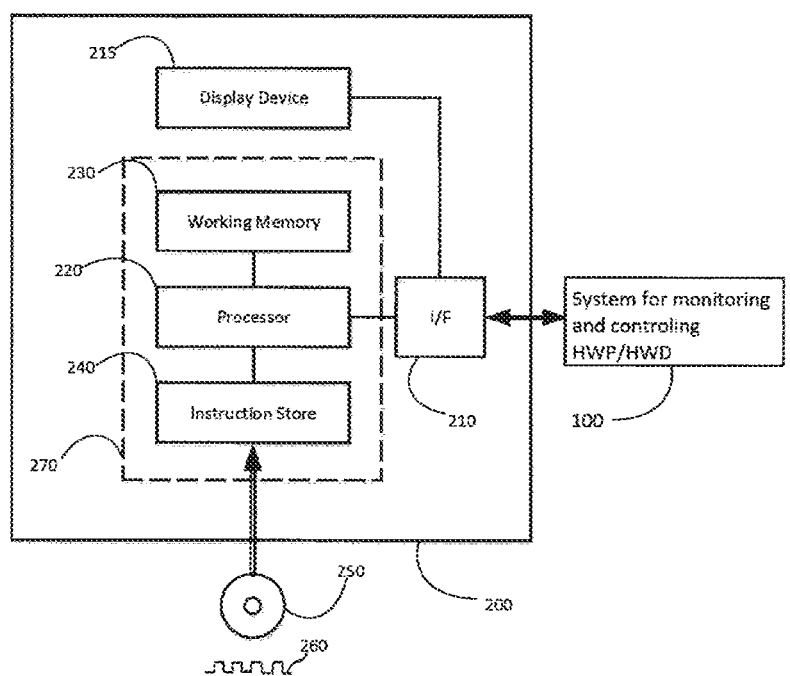
FIG. 4 is a block diagram illustrating an example signal processing hardware configuration of the system of FIG. 2, according to an aspect of the present invention.

FIG. 4 is a block diagram illustrating an example signal processing hardware configuration of the system of FIG. 2, according to an aspect of the present invention, which may be configured to function as the controller 1 of FIG. 2. The programmable signal processing hardware 200 comprises a communication interface (I/F) 210 for receiving the (real) temperature data of the (real) temperature sensors 10A to 10E described above, generating the instruction for the system 100 for monitoring and/or controlling domestic hot water production and/or distribution to perform the temperature measurement on the hot water storage tank 20, receiving the measurement data from the (real) temperature sensors 10A to 10E, determining a temperature distribution pattern TDP of heat stored in the heat storage tank 20 and corresponding heat distribution pattern data, and, optionally, for determining an amount of heat stored in the heat storage tank and/or determining an amount of heat tapped from the heat storage tank, and for outputting display control signals for controlling the display device 215 to display the heat distribution pattern, the amount of heat stored in the heat storage tank and/or the amount of heat tapped from the heat storage tank. The signal processing apparatus 200 further comprises a processor, the control unit 2, (e.g. a Central Processing Unit. CPU, or Graphics Processing Unit, GPU) 220, a working memory 230 (e.g. a random access memory) and an instruction store 240 storing a computer program comprising the computer-readable instructions which, when executed by the processor 220, cause the processor 220 to perform various functions including those of the system 100 for monitoring and/or controlling domestic hot water production and/or distribution and optionally, a display control signal generator. The instruction store 240 may comprise a ROM (e.g. in the form of an electrically-erasable programmable read-only memory (EEPROM) or flash memory) which is pre-loaded with the computer-readable instructions. Alternatively, the instruction store 240 may comprise a RAM or similar type of memory, and the computer-readable instructions of the computer program can be input thereto from a computer program product, such as a non-transitory, computer-readable storage medium 250 in the form of a CD-ROM, DVD-ROM, etc. or a computer-readable signal 260 carrying the computer-readable instructions. In any case, the computer program, when executed by the processor, causes the processor to execute at least one of the methods of monitoring and/or controlling domestic hot water production and/or distribution described herein. It should be noted, however, that the controller 1 may alternatively be implemented in non-programmable hardware, such as an application-specific integrated circuit (ASIC).

In the present aspect of the present invention, a combination 270 of the hardware components shown in FIG. 4, comprising the processor 220, the working memory 230 and the instruction store 240, is configured to perform functions of the system 100 for monitoring and/or controlling domestic hot water production and/or distribution, which functions will now be described in detail below. In aspects like the present aspect of the present invention, where the system 100 comprises a display control signal generator, the functionality of this optional component also be provided by the combination 270 of the hardware components, together with the communication I/F 210.

As will become more apparent from the following description of the operations performed by the controller 1 and/or the system 100 of the present aspect, the controller 1 and/or the system 100 automatically processes temperatures and/or temperature date and optionally flow rates and/or flow rate data acquired by respective sensors, in order to determine a very accurate heat distribution pattern TDP of heat or equivalent hot water stored in the heat storage tank or hot water storage tank.

Figure 5:
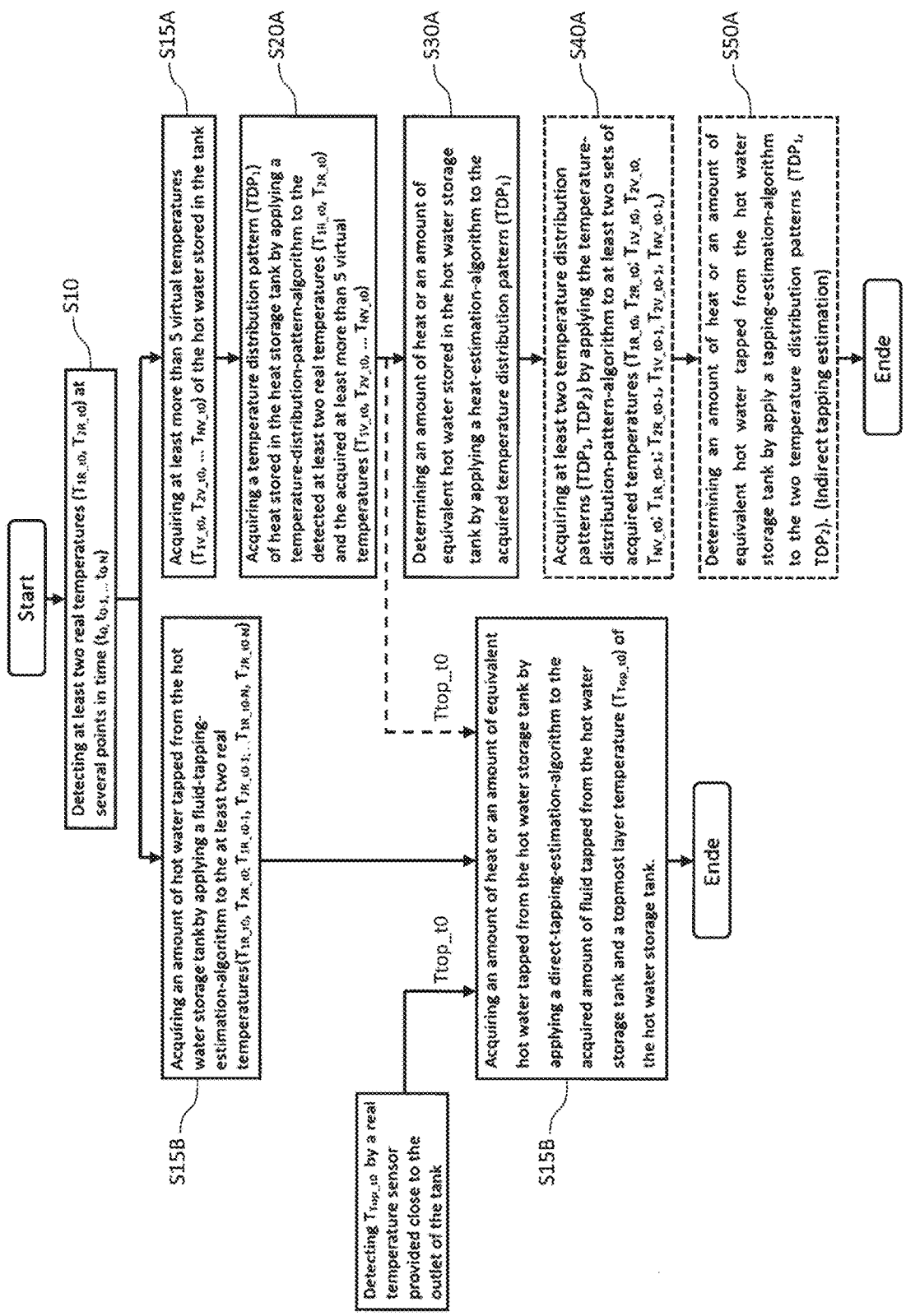
FIG. 5 is a flow diagram illustrating a process by which the system of FIG. 2 acquires a temperature distribution pattern $TDP_1$ of heat stored in the heat storage tank and determines an amount of heat or an amount of equivalent hot water stored, in accordance with an aspect of the present invention.

FIG. 5 is a flow diagram illustrating a process by which the system 100 of FIG. 2 acquires a temperature distribution pattern $TDP_1$ of beat stored in the heat storage tank 20 and determines an amount of heat or an amount of equivalent hot water stored in the tank 20 and optionally tapped from the heat storage tank 20. Moreover, FIG. 5 illustrates an alternative process for acquiring an amount of heat or an amount of equivalent hot water tapped from the heat storage tank 20.

In process S10 of FIG. 5, the controller 1, in particular the control unit 2, receives temperature data, particularly at least two real temperature data comprising each several real temperature measurements ($T_{1R\_t0}$, $T_{2R\_t0}$; $T_{1R\_t0-1}$, $T_{2R\_t0-2}$; $T_{1R\_t-n}$, $T_{2R\_tn}$) at several points in time (history), from real temperature sensors provided on the hot water storage tank 20 and configured to detect temperatures of the hot water stored in the tank 20.

In process S15A of FIG. 5, the controller 1, in particular the control unit 2, acquires a plurality of virtual temperatures ($T_{1V\_t0}$, $T_{2V\_t0}$, ... $T_{NV\_t0}$) of the hot water stored in the hot water storage tank 20 by applying a virtual-temperature-sensor-algorithm to the detected at least two real temperatures detected at least at few points in time.

In process S20A of FIG. 5, the controller 1, in particular the control unit 2, acquires a (first) temperature distribution pattern $TDP_t$ of the hot water stored in the hot water storage tank 20 by applying a temperature-distribution-pattern-algorithm to the acquired at least two real temperatures ($T_{1R\_t0}$, $T_{2R\_t0}$; $T_{1R\_t0-1}$, $T_{2R\_t0-2}$; $T_{1R\_t-n}$, $T_{2R\_tn}$) and the acquired plurality of virtual temperatures ($T_{1V\_t0}$, $T_{2V\_t0}$, ... $T_{NV\_t0}$). The used machine-learning temperature-distribution-pattern-algorithm was trained before by using the above with reference to FIG. 3 described system 100 for training/simulation. The training/machine-learning of the temperature-distribution-pattern-algorithm will be explained in more detail below with reference to FIGS. 6, 7 and 8.

Moreover, in process S30A of FIG. 5, the controller 1, in particular the control unit 2, determines an amount of heat, in particular an amount of equivalent hot water, stored in the heat storage tank or hot water storage tank 20 by applying a heat-estimation-algorithm to the acquired temperature distribution pattern $TDP_1$.

Yet, in an optional process (indicated by dashed line), as shown in FIG. 5, the process S20 is repeated at least once S40A and thereby at least two temperature distribution patterns $TDP_1$, $TDP_2$ are determined by applying the above described temperature-distribution-pattern-algorithm to at least two sets of acquired temperatures $T_{1R\_t0}$, $T_{2R\_t0}$, $T_{1V\_t0}$, $T_{2V\_t0}$, ... $T_{NV\_t0}$; $T_{1R\_t0-1}$, $T_{2R\_t0-1}$, $T_{1V\_t0-1}$, $T_{2V\_t0-1}$, ... $T_{NV\_t0-1}$).

In a further optional process (indicated by dashed line), in a process S50A shown in FIG. 5 an amount of heat and/or amount of equivalent hot water, tapped from the heat storage tank or hot water storage tank 20 is determined by apply an indirect-tapping-estimation-algorithm to the two acquired temperature distribution patterns $TDP_1$, $TDP_2$.

As already explained above with respect to FIG. 3, in the training phase of the system 100 (training system), the system 100 is not only provided with the at least two (real) temperature sensors, but instead is provided with for example 25 (real) temperature sensors. Accordingly, in the training phase (machine-learning phase) of system 100, the controller 1 receives 25 temperature data $T_{1\_r0}$, $T_{2\_r0}$ . . . $T_{25\_r0}$.

Figure 6:
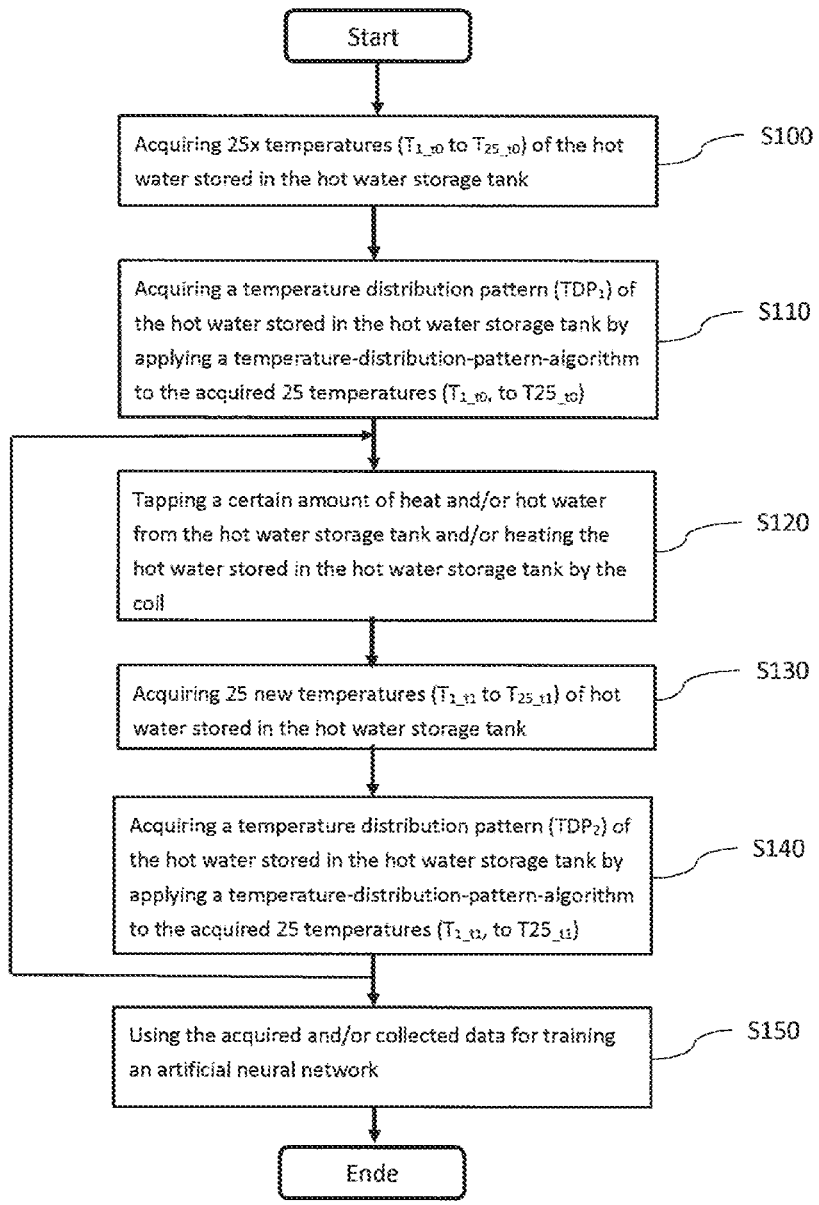
FIG. 6 is a flow diagram illustrating an offline data collecting process for a training process of the system in the training stage shown in FIG. 3.

FIG. 6 is a flow diagram illustrating an offline data collecting process for a training process of the system, in particular of an artificial neural network of the system, in the training stage shown in FIG. 3. With "offline data collecting" is meant that the necessary data for training the neural network and the corresponding algorithms are collected before the training is actually performed. Meaning, at first, all necessary data are collected during a specified period, like a day, a week or several months. After the necessary data have been collected the data a pre-processed and then inputted in the neural network in order to train it.

In process S100 of FIG. 6, the controller 1, in particular the control unit 2 (processor), is receiving 25 real temperature data $T_{1\_r0}$ to $T_{25\_r0}$ of the hot water stored in the hot water storage tank 20, by using 25 real temperature sensors 10A to 10XY provided a long the height of the hot water storage tank 20.

In process S110 of FIG. 6, the controller, in particular the control unit 2, determines a temperature distribution pattern $TDP_1$ of the hot water stored in the hot water storage tank 20 by processing the acquired temperatures $T_{1\_r0}$, $T_{2\_r0}$ . . . $T_{1\_r25-0}$ using the above described temperature-distribution-pattern-algorithm.

In process S120 of FIG. 6, a certain amount of heat (kWh) and/or equivalent hot water (1) is tapped from the hot water storage tank using the flow rate sensor 30 provided at the outlet of the hot water storage tank and a top tank temperature sensor 10XY (the highest sensor of the real and virtual sensors). Moreover, optionally, a heating (kWh) of the stored hot water via the coil 21 is conducted while the flow of the fluid through the coil 21 is measured by the flow rate sensor 31 of the coil and the inlet and outlet temperatures of the fluid are measured by the inlet and outlet temperature sensors 15, 16 of the coil 21.

Moreover, in process S130 of FIG. 6 new temperatures $T_{1\_t1}$ to $T_{25\_t1}$ of the hot water stored in the hot water storage tank 20 are acquired and in process S140, in line with the process S110, a temperature distribution pattern $TDP_2$ of the hot water stored in the hot water storage tank 20 is determined using the new acquired temperatures $T_{1\_t1}$ to $T_{25\_t1}$.

The above process is repeated continuously until sufficient data for training the neural network could be acquired and/or collected. In process S150 of FIG. 6 the acquired and/or collected data are used for training the artificial neural network. The training will be explained in more detail below with reference to FIGS. 9 and 10.

Figure 7:
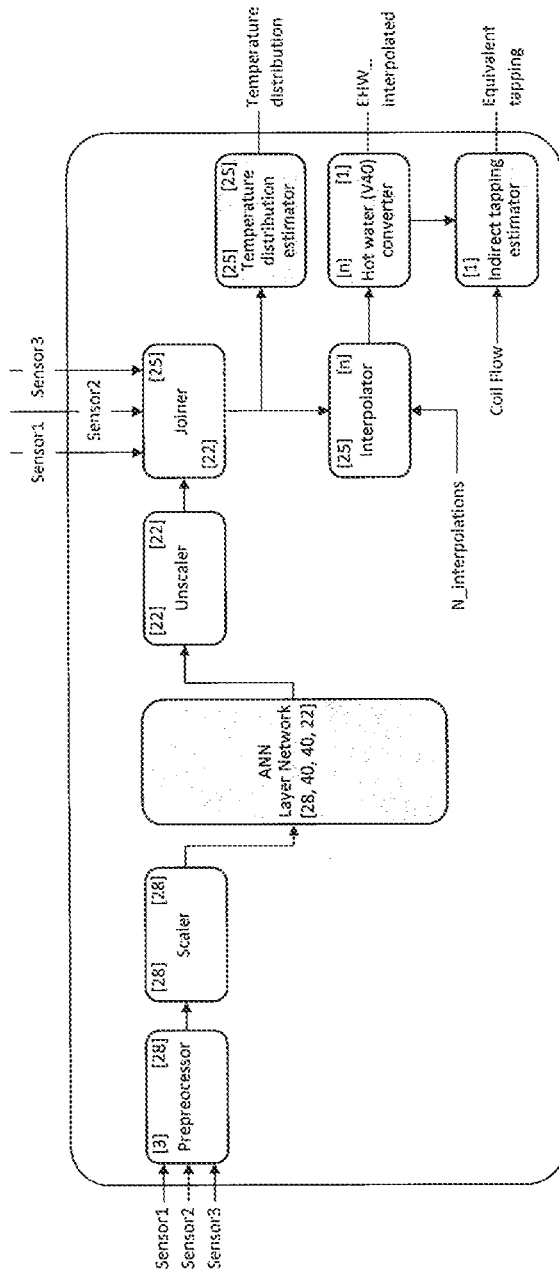
FIG. 7 is a block diagram illustrating a process by which the system of FIG. 2 determines an amount of heat (EHW, $V_{40}$) stored in the heat storage tank, in accordance with an aspect of the present invention.

FIG. 7 is a block diagram illustrating a process by which the system 100 of FIG. 2 determines an amount of heat (remaining equivalent hot water at $t_0$ (EHW, V40) stored in the heat storage tank, in accordance with an aspect of the present invention. As shown in FIG. 7, the real temperatures detected by the at least two real temperature sensors 10A, 10B, in the present aspect Sensor 1, Sensor 2 and Sensor 3, are received by the controller 1, in particular by a pre-processor of the controller 1 or the control unit 2.

The pre-processor takes the best subset for the respective heat storage tank 20, pre-processes the real temperatures and/or temperature data received from the sensors 1 to 3 and calculates new features. By calculating new features is meant that the pre-processor uses the history, for example real temperatures measured by the sensors 1 to 3 in the past, and provides a data package of example 28 data.

In a next step, a scaler scales the features down in preparation for a model of a neural network. The scaled features are input into an (artificial) neural network (ANN), which has been trained as described above and in more detail below with regard to FIGS. 9 and 10, and consists for example of two hidden layers of 40 nodes and estimates the remaining 22 virtual sensors (of the above described training system) based on the received features. Then, an unscaler scales the features back up to its original range and a joiner combines the data of the real three sensors 1 to 3 with the data of the virtual 22 sensors.

The data from the joiner are inputted into a temperature distribution estimator for determining the temperature distribution pattern TDP of the hot water storage tank.

Moreover, the data of the joiner are sent to an interpolator which increases the number of virtual sensors used for determining the temperature distribution pattern TDP in order to remove artefacts in the later converted or calculated heat/equivalent hot water (EHW, V40).

Additionally, after the interpolator the determined data are sent to a hot water-converter (EHW, V40) and after that optionally processed by a filter for further smoothening the output (EHW, V40) if the interpolator cannot remove all artefacts.

In a last optional step, a coil flow (1/min) detected by a flow sensor configured to detect a fluid flow through the coil is used to estimate tapping by an indirect tapping estimator. Thereby, it becomes possible to estimate the heat (kWh) and/or equivalent hot water (EHW, V40) tapped from the hot water storage tank 20. When estimating the heat (kWh) and/or equivalent hot water (1) that has been tapped from the hot water storage tank 20, the indirect tapping estimator may remove or compensate heat loss due to heat transfer to the surrounding environment and may remove or compensate heat that is added to the hot water storage tank 20 by heating via the heat coil 21.

Figure 8:
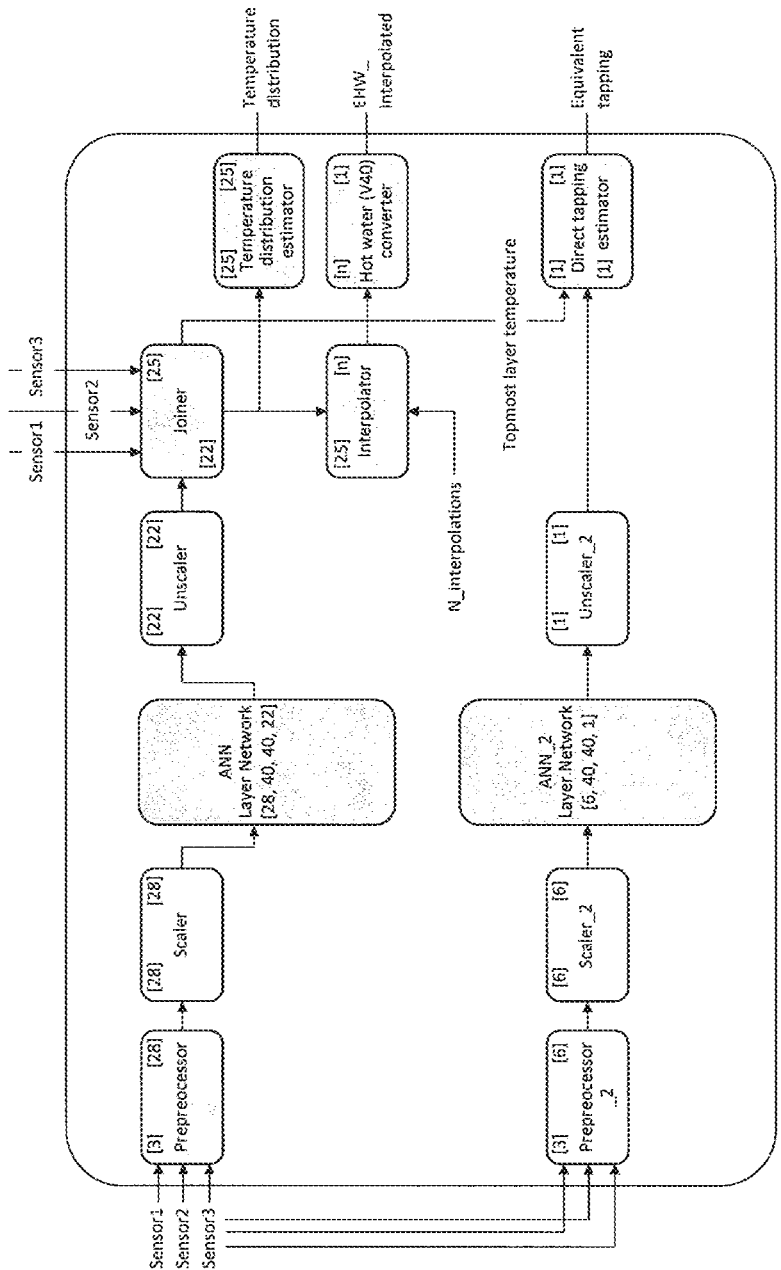
FIG. 8 is a block diagram illustrating a process by which the system of FIG. 2 determines an amount of heat tapped from the heat storage tank, in accordance with a further aspect of the present invention.

FIG. 8 is a block diagram illustrating a process by which the system 100 shown in FIG. 2 directly determines an amount of heat and/or equivalent hot water (EHW, V40) tapped from the heat storage tank, in accordance with a further aspect of the present invention. The process or system (control unit) shown in FIG. 8 comprises all features/steps or components of the process or system shown in FIG. 7, except the indirect tapping estimator.

Additionally, the shown process includes a second (parallel) process-line for directly determining the amount of heat and/or equivalent hot water (EHW, V40) tapped from the heat storage tank. As shown, the three real temperatures detected by the sensors 1 to 3 are inputted into a second pre-processor that takes the best subset for the respective heat storage tank 20, pre-processes the real temperatures and calculates new features. Said features comprise the newly inputted real temperatures as well as previously inputted real temperatures (history).

A second scaler scales the features down in preparation for a second model of a second (artificial) neural network (ANN_2), which has been trained as described below, particularly with regard to FIG. 10, and consists for example of two different layers of 40 nodes and estimates the amount of hot water tapped from the tank. Here, only an amount of water without any indication of energy stored in the tapped water is estimated. Then, an unscaler scales the features back up to its original range and provides the estimated amount of tapped hot water to a direct tapping estimator.

The direct tapping estimator estimates heat and/or equivalent hot water that has been tapped from the hot water storage tank by using the estimated amount of tapped hot water (provided by the second neural network) and a topmost layer temperature (believed real temperature of the hot water taped from the hot water storage tank) detected by the topmost temperature sensor of the 25 sensors (22 virtual sensors+3 real sensors). When estimating the heat or equivalent hot water tapped from the hot water storage tank 20, the direct tapping estimator may remove or compensate heat loss due to heat transfer to the surrounding environment. Here, it is also possible to use instead of one of the 22 virtual sensors of the first neural network a real installed temperature sensor, thereby making the first neural network obsolete for the determination of the tapped heat or equivalent hot water.

Figure 9:
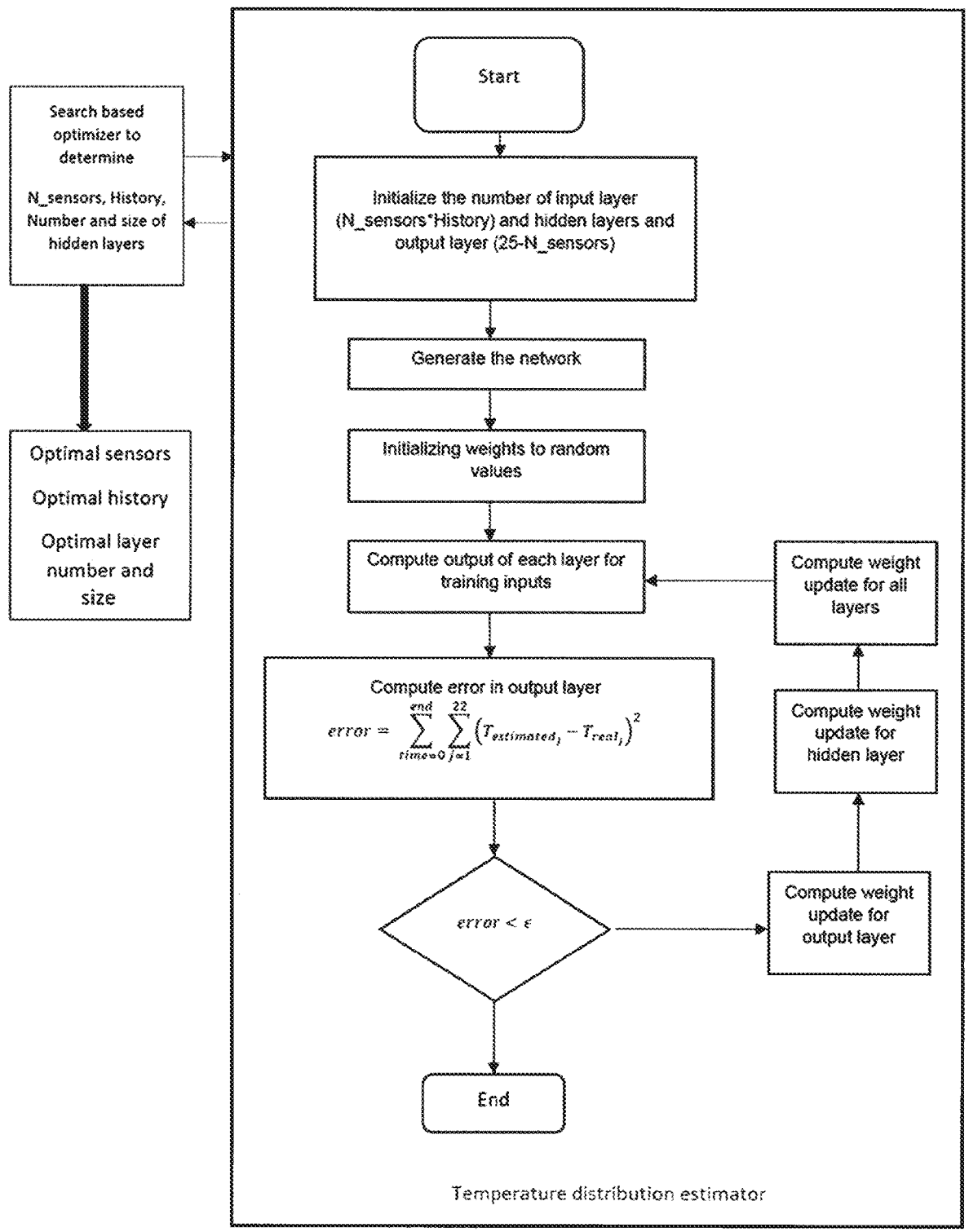
FIG. 9 is a flow diagram illustrating a training process of the temperature distribution estimator of FIGS. 7 and 8 in accordance with an aspect of the present invention.

FIG. 9 is a flow diagram illustrating a training process of the temperature distribution estimator of FIGS. 7 and 8 in accordance with an aspect of the present invention. As shown, in a first step, the numbers of input layers (number of real sensors * history (number of available data; points in time), hidden layers and output layers (number of virtual sensors) are initialized. In a next step the artificial neural network (ANN) is generated and the weights of the ANN are set in the beginning to random values.

In a next step, the output of each layer is computed for training inputs (the data which have been collected in the offline data collecting process) and an error in the output layer is computed based on the estimated values (temperatures) and the real values (temperatures).

Based on the computed error, new values (updates) for the weights of the output layer and the hidden layer of the ANN are computed and set. Then, the computing of the output of each layer using the training inputs is repeated, using the updated weights. This is done until the computed error is below a required threshold value. Once, the threshold value is reached, the training of the artificial neural network can be finished.

During the above described process, the number and position of real and virtual sensors, the history (number of temperature sets at several time points), and the optimal layer number and optimal weights can be optimized. This means, out of the for example 25 sensors, which are used during training of the neural network, the at least two sensors are chosen as the real sensors, which provide the overall best result in accuracy of estimating the temperature distribution pattern when compared with the real measured temperature distribution pattern. Same applies of the number of real and virtual sensors, number of considered previous data sets (history) and number of layers and size of the layers of the artificial neural network.

Figure 10:
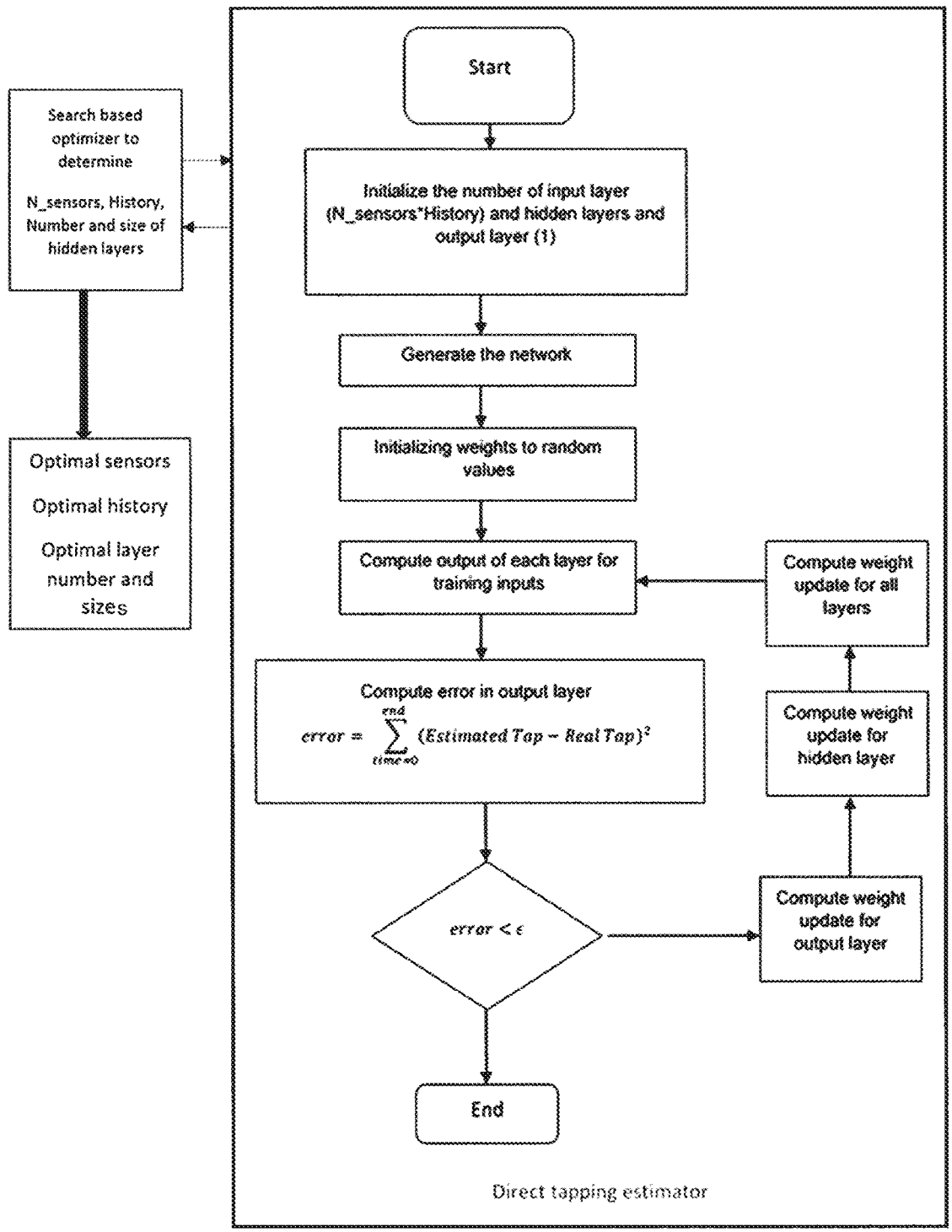
FIG. 10 is a flow diagram illustrating a training process of the direct tapping estimator of FIG. 8 in accordance with a further aspect of the present invention.

FIG. 10 is a flow diagram illustrating a training process of the direct tapping estimator of FIG. 8 in accordance with a further aspect of the present invention. Said process is in basic the same machine-learning process as shown in FIG. 9, except that instead of temperatures (temperature distribution patterns) amounts of hot water tapped from the hot water storage tank are estimated and/or trained. Accordingly, in the step of computing the error in the output layer, the estimated amount of heat and/or equivalent hot water tapped from the hot water storage tank is compared with real values measured by a flow rate sensor and if applicable a temperature sensor. By this training process the second neural network of FIG. 8 is trained.

The regression-algorithm described above may, as in the present aspect, be a neural network. Neural networks automatically generate identifying characteristics by processing the input data, such as the temperature data detected by temperature sensors 10A to 10XY, the heat coil input and/or output temperature data detected by the heat coil temperature sensors 15, 16 and the flow rate data detected by the flow rate sensors 30, 31, without any prior knowledge.

Figure 11:
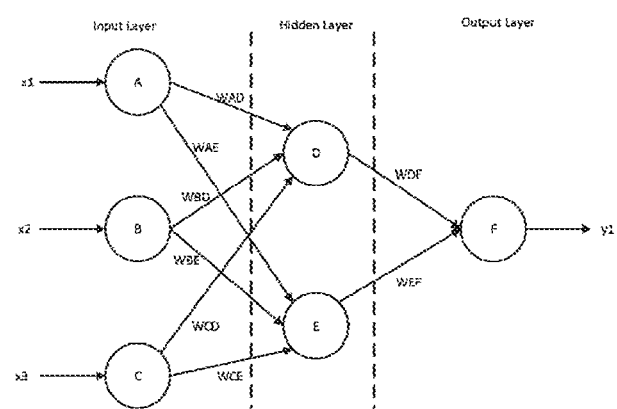
FIG. 11 is a schematic illustration of a neural network comprising artificial neurons in an input layer, a hidden layer, and an output layer.

As illustrated in FIG. 11, in general, a neural network consists of an input layer and an output layer, as well as multiple hidden layers. Each of the layers is composed of a plurality of artificial neurons (labelled A to F in FIG. 11), and each layer may perform different kinds of transformations on their inputs. Each artificial neuron may be connected to multiple artificial neurons in adjacent layers. The output of each artificial neuron is computed by some non-linear function of the sum of its inputs. Artificial neurons and the connections therebetween typically have respective weights (WAD, WAE, etc. in FIG. 11) which determined the strength of the signal at a given connection. These weights are adjusted as learning proceeds, thereby adjusting the output of the neural network. Signals travel from the first layer (the input layer), to the last layer (the output layer), and may traverse the layers multiple times.

The output of the neural network may be viewed as a probability of the detected temperatures $T_{1\_0}$ to $T_{n\_n}$ containing identifying characteristic of the temperature distribution pattern of the heat stored in the heat storage tank 20 and the determination may, comprise determining which stored or trained distribution pattern corresponds to the actually heat distribution pattern being present in the heat storage tank.

In the case where the learning algorithm is a neural network, as in the present aspect of the invention, the system 100, particularly the controller 1, may be configured to search for the corresponding stored or trained distribution pattern by deconstructing the neural network.

Figure 12:
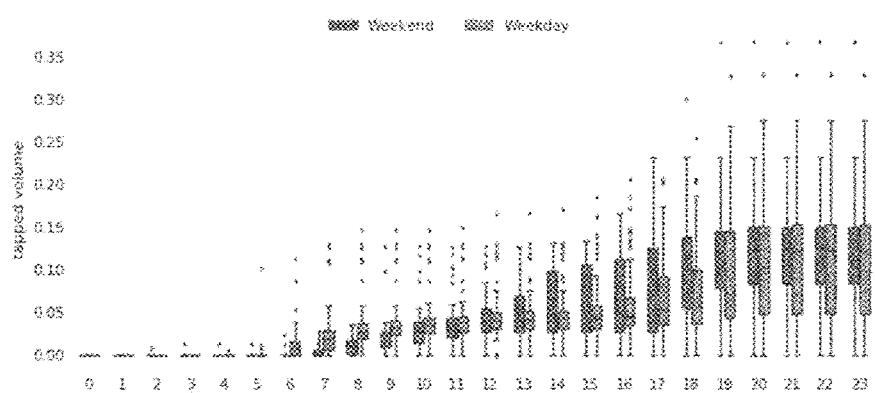
FIG. 12 is a diagram illustrating a user consumption pattern acquired by the system for monitoring and/or controlling domestic hot water production and/or distribution shown in FIG. 2.

FIG. 12 is a diagram illustrating a user accumulative consumption pattern acquired by the system for monitoring and/or controlling domestic hot water production and/or distribution shown in FIG. 2. FIG. 12 shows the consumed or tapped equivalent hot water volume in $m^3$ during weekdays and weekends. As can be taken from FIG. 12, the acquired consumption pattern (over time) does not only change during the day but also for example between weekdays and weekends.

What is claimed is:

1. A method of at least one of monitoring and controlling at least one of domestic hot water production and distribution, the method comprising:
    using a controller including a processor to execute:
    detecting at least two real temperatures of a fluid stored in a heat storage tank at two different positions along a height of the heat storage tank at least at points in time, the fluid being sanitary hot water, and the heat storage tank being a pressurized tank;
    acquiring a plurality of virtual temperatures of the fluid stored in the heat storage tank at different positions along the height of the heat storage tank by applying a virtual-temperature-sensor-algorithm to the detected at least two real temperatures detected at least at the points in time;
    acquiring at least one of a temperature distribution pattern of heat stored in the heat storage tank or corresponding heat distribution pattern data by applying a temperature-distribution-pattern-algorithm to the at least two real temperatures detected at least at the points in time and the plurality of virtual temperatures; and controlling the heat storage tank based on the at least one of the temperature distribution pattern and the corresponding heat distribution pattern data.

2. The method according to claim 1, wherein
the plurality of virtual temperatures includes at least 5 virtual temperatures.

3. The method according to claim 1, further comprising:
at least one of
   determining an amount of heat stored in the heat storage tank by applying a heat-estimation-algorithm to at least one of the temperature distribution pattern and the at least two real temperatures, and the plurality of virtual temperatures, the heat being an amount of equivalent hot water, and
   acquiring at least one of at least two temperature distribution patterns and corresponding heat pattern data by applying the temperature-distribution-pattern-algorithm to at least two sets from among the at least two real temperatures and the plurality of virtual temperatures, and
determining an amount of heat tapped from the heat storage tank by applying an indirect-tapping-estimation-algorithm to the at least two temperature distribution patterns.

4. The method according to claim 1, wherein
the temperature-distribution-pattern-algorithm includes
determining the temperature distribution pattern of the heat stored in the heat storage tank by processing the at least two real temperatures and the plurality of virtual temperatures using a regression-algorithm, and
the regression-algorithm trained on temperature data defining temperature distribution patterns of the heat stored in the heat storage tank using one or more machine-learning-algorithms.

5. The method according to claim 4, wherein
the regression-algorithm is trained on at least one of
   at least one of temperatures and temperature data detected by a plurality of temperature sensors used to detect the temperatures, provided at different positions along the height of the heat storage tank,
   at least one of heat coil input and output temperature during heating of the fluid stored in the heat storage tank,
   at least one of flow rate at an inlet and an outlet of the fluid into and from the heat storage tank, and
   flow rate of a fluid flowing through the heat coil.

6. The method according to claim 1, further comprising:
at least one of
   acquiring at least one of a flow rate and amount of fluid tapped from the heat storage tank by using at least one flow rate sensor arranged at an outlet of the fluid from the heat storage tank, and
   determining an amount of heat tapped from the heat storage tank by applying the indirect-tapping-estimation-algorithm to the at least two temperature distribution patterns and the flow rate of the fluid flowing through the heat coil, the heat being an amount of equivalent hot water.

7. A method of at least one of monitoring and controlling at least one of domestic hot water production and distribution, the method comprising:
using a controller including a processor to execute:
detecting at least two real temperatures of a fluid stored in a heat storage tank at two different positions along a height of the heat storage tank at least at points in time, the fluid being sanitary hot water, and the heat storage tank being a pressurized tank;
acquiring at least one of a temperature distribution pattern of heat stored in the heat storage tank or corresponding heat distribution pattern data by applying a temperature-distribution-pattern-algorithm to the at least two real temperatures detected at least at the points in time; and
controlling the heat storage tank based on the at least one of the temperature distribution pattern and the corresponding heat distribution pattern data,
the temperature distribution pattern being at least one of acquired and determined by using
   the at least two real temperature sensors, and
   a plurality of virtual temperature sensors used to acquire the plurality of virtual temperatures, the plurality of virtual temperature sensors including at least 5 virtual temperature sensors,
   the virtual temperature sensors being at least one of provided and simulated by a neural network.

8. The method according to claim 1, further comprising:
acquiring a user consumption pattern by applying a user-consumption-algorithm to at least one of
   the acquired temperature distribution pattern of the heat stored in the heat storage tank,
   the determined amount of heat or amount of equivalent hot water, stored in the heat storage tank,
   the determined amount of heat or equivalent hot water tapped from the heat storage tank by using the indirect-tapping-estimation-algorithm, and
   the determined amount of fluid or hot water tapped from the heat storage tank by using the at least one flow rate sensor.

9. The method according to claim 8, further comprising:
determining at least one of a heating pattern and a hot water production control pattern of the fluid stored in the heat storage tank by applying a heating-pattern-algorithm to the acquired user consumption pattern,
at least one of the user consumption pattern, the heating pattern, hot water production control pattern being divided into time increments of at least one of one day, 12 hours, 6 hours, 1 hour, 30 minutes, 10 minutes, and 1 minute.

10. The method according to claim 1, wherein
at least ten temperatures are acquired at least at ten points in time before a temperature distribution pattern of the heat storage tank is determined.

11. A method of at least one of monitoring and controlling at least one of domestic hot water production and distribution, the method comprising:
using a controller including a processor to execute:
detecting at least two real temperatures of a fluid stored in a heat storage tank at two different positions along a height of the heat storage tank at least at points in time, the fluid being sanitary hot water, and the heat storage tank being a pressurized tank;
acquiring an amount of fluid tapped from the heat storage tank by applying a fluid-tapping-estimation-algorithm to the at least two real temperatures detected at least at few points in time;
acquiring an amount of heat or an amount of equivalent hot water tapped from the heat storage tank by applying a direct-tapping-estimation-algorithm to the acquired amount of fluid tapped from the heat storage tank and a topmost layer temperature of the heat storage tank; and controlling the heat storage tank based on the amount of heat or the amount of equivalent hot water.

12. The method according to claim 11, wherein the topmost layer temperature is at least one of
    detected by a real temperature sensor provided near an outlet of the heat storage tank, and
    acquired by a topmost real temperature sensor or virtual temperature sensor.

13. A controller configured to execute the method according to claim 1.

14. A system including the controller according to claim 13.

15. The system according to claim 14, further comprising:
    the heat storage; and
    at least two temperature sensors provided at two different positions along the height of the hot water storage tank and configured to detect the temperature of a fluid stored in the heat storage tank.

16. The system according to claim 14, wherein
    the at least two temperature sensors include no more than 5 temperature sensors, and one of the at least two temperature sensors is located in a bottom half of the heat storage tank.

17. The method according to claim 1, wherein
    the controller executes a computer program including instructions to execute the method.

18. A non-transitory computer-readable medium having the computer program according to claim 17 stored thereon.

* * * * *